United States Patent [19]

Wood et al.

[11] Patent Number: 4,666,558

[45] Date of Patent: May 19, 1987

[54] PROCESS FOR NEWSPAPER DEINKING USING LOW-FOAMING SURFACTANT DEINKING AGENT

[75] Inventors: Donald L. Wood; Louis Kravetz, both of Houston, Tex.

[73] Assignee: Shell Oil Company, Houston, Tex.

[21] Appl. No.: 807,719

[22] Filed: Dec. 11, 1985

[51] Int. Cl.$^4$ ................................................ D21C 5/02
[52] U.S. Cl. ............................................ 162/5; 162/7; 162/8
[58] Field of Search ................................ 162/5, 6, 7, 8

[56] References Cited

U.S. PATENT DOCUMENTS 3,808,089  4/1974  VonKocppen et al. ................ 162/5
4,162,186  7/1979  Wood et al. ............................ 162/5

*Primary Examiner*—S. Leon Bashore
*Assistant Examiner*—K. M. Hastings

[57] ABSTRACT

A process for the deinking of waste newsprint, which comprises steps for (a) converting the waste newsprint to a pulp, (b) contacting and agitating the pulp in an aqueous medium containing a deinking agent comprising a mixture of (i) a water-soluble $C_9$ to $C_{16}$ alkanol ethoxylate component having an average of about 6.5 to 20 oxyethylene units per ethoxylate molecule and (ii) an oil-soluble $C_9$ to $C_{16}$ alkanol ethoxylate component having an average of about 0.5 to 3.5 oxyethylene units per ethoxylate molecule, said mixture containing the respective components (i) and (ii) in a relative weight ratio in the range from about 2:1 to 1:3, and said mixture being present in said aqueous medium in an amount between about 0.1 and 5 percent by weight based on the dry weight of the newsprint fiber, and (c) recovering deinked pulp from the aqueous medium.

The invention offers high performance in the removal of ink from pulp fibers and substantially eliminates the foaming of aqueous surfactant solution. Foaming has been recognized as a problem in conventional deinking processes employing deinking agents containing alcohol ethoxylate surfactants.

13 Claims, No Drawings

PROCESS FOR NEWSPAPER DEINKING USING LOW-FOAMING SURFACTANT DEINKING AGENT

FIELD OF THE INVENTION

This invention relates to a process for the deinking of waste newspaper. More particularly, the invention is directed to an improved aqueous deinking process utilizing a nonionic surfactant deinking agent.

BACKGROUND OF THE INVENTION

Wastepaper has long served as a source of the raw fiber materials used in papermaking. Traditionally, fiber from wastepaper was utilized only in the production of low grade paper and paperboard products. Today, however, greater utilization of reclaimed fiber (about 25 percent of the total fiber used in papermaking) has provided incentive for taking steps to upgrade the reclaimed product, including treatments to effectively remove ink from the waste fibers.

Because of its quantity, waste newsprint is a particularly important feedstock to such reclamation processes.

It is known in the art that the removal of ink from wastepaper can be accomplished in a process in which the paper is reduced to a pulp and the pulp is contacted with an aqueous medium containing a surfactant "deinking agent". It is further recognized in the prior art that ethoxylates of aliphatic alcohols are useful surfactant deinking agents in such deinking processes. Such alkanol ethoxylates are mixtures of compounds of the formula $RO-(CH_2CH_2O)_n H$, where R is an alkyl moiety and n is an integer. Compounds of the mixture have a characteristic distribution of their values for n.

One such prior art process of particular relevance to the present invention is that described by D. C. Wood et al in U.S. Pat. No. 4,162,186. The process described and claimed in that patent involves the use of a deinking agent which necessarily comprises both a water-soluble nonionic surfactant and an oil-soluble nonionic surfactant, in a respective weight ratio of between 6:1 and 3:1. Oil-soluble surfactants are exemplified by ethoxylates of aliphatic $C_5$ to $C_{20}$ alcohols having an average of from about 0.5 to 3.5 oxyethylene units in the molecule, while water-soluble nonionic surfactants are exemplified by ethoxylates of aliphatic $C_5$ to $C_{20}$ alcohols having an average of from about 7 to 50 oxyethylene units in the molecule.

A significant drawback associated with the use in such processes of water-soluble ethoxylated aliphatic alcohol deinking agents is their tendency to enhance foaming in the aqueous deinking medium. Foaming in the papermill system is known (see, for example, R. E. Freis, "Reduced Temperature Deinking", Proceedings of the Technical Association of the Pulp and Paper Industry, 1980 Pulping Conference, pp. 121–125) to cause: (1) reduced efficiency in screens, deckers, cleaners and washers; (2) undesirable variations and flaws in papermaking; and (3) ecological problems in the process effluent.

SUMMARY OF THE INVENTION

A process improvement has now been found which substantially eliminates the foaming problems which have been encountered in conventional aqueous wastepaper deinking processes employing surfactant deinking agents containing a water-soluble ethoxylate of one or more higher alkanols. This process improvement is achieved by incorporating into the deinking agent, in combination with the water-soluble surfactant, a certain critical amount of an oil-soluble ethoxylate of one or more higher alkanols. For this purpose, the water-soluble alkanol ethoxylate and the oil-soluble alkanol ethoxylate components are combined in a respective weight ratio which necessarily does not exceed about 2:1.

At least in applications to the deinking of newsprint, the invention provides for the substantial reduction or elimination of foaming in the aqueous deinking medium without adverse influence upon deinking performance and reclaimed paper product brightness.

Accordingly, in brief summary, the present invention can be described as a process for the deinking of waste newsprint which comprises steps of (a) converting the waste newsprint to a pulp, (b) contacting and agitating the pulp in an aqueous medium containing a deinking agent comprising a mixture of (i) a water-soluble ethoxylate of one or more $C_9$ to $C_{16}$ alkanols and (ii) an oil-soluble ethoxylate of one or more $C_9$ to $C_{16}$ alkanols, said mixture containing the respective components (i) and (ii) in a relative weight ratio between about 2:1 and 1:3, and (c) recovering deinked pulp from the aqueous medium.

The performance of the invention is critically dependent both upon the use of a deinking agent which combines the water-soluble and the oil-soluble alkanol ethoxylates, and also upon the particular relative proportion of these two types of ethoxylates in such combination.

DESCRIPTION OF THE PREFERRED EMBODIMENTS

The invention is broadly applicable to wastepaper deinking processes which include processing steps for the agitated contact of newsprint pulp with a surfactant agent in an aqueous medium. With the exception of the critical specifications now placed upon the composition of the deinking agent, the invention is, in general, suitably practiced employing procedures and conditions well known in the prior art for the deinking of waste newsprint.

In this regard, the process of the invention includes a step in which the newsprint is converted to a pulp, that is, to a deinking feedstock which has been substantially reduced to individual fibers. Pulping is very suitably performed using any of the various conventional processes and equipment designed for this purpose. Most conveniently, the newsprint is treated in a device known as a "hydropulper", which produces a slurry of the fibers in water.

For purposes of the invention, the pulp is contacted, in an aqueous medium, with the surfactant deinking agent. The medium typically contains between about 0.5 and 10.0% w (percent by weight) of pulp (calculated on dry weight of the newsprint fiber, relative to total weight of the medium). This percentage of pulp content is commonly referred to as the "consistency" of the pulp in the medium. Surfactant deinking agent is typically present in the aqueous deinking medium in a quantity between about 0.1 and 5.0% w, relative to the dry weight of the newsprint fiber. Preferences can typically be expressed for a consistency which is in the range of from about 1 to 5% w and for a quantity of deinking agent which is between about 0.5 and 2.0% w, calculated on dry weight of pulp fiber. The aqueous medium suitably contains one or more additional components as are commonly present in conventional deinking processes. Particular mention can be made of an alkaline agent which serves to aid in the detachment of ink from the fibers by weakening the ink binder. Alkalinity of the aqueous medium is typically maintained by addition of a base such as caustic and/or sodium silicate in a quantity between about 1 and 5% w, calculated on dry weight of the pulp fiber. Other common components of the deinking medium include brighteners, solvents, bleaches, and water softeners. Contact between the pulp and the aqueous medium preferably takes place under agitation and at elevated temperature, for instance at a temperature in the range from about 70° F. to 130° F., more preferably, a temperature in the range from about 110° to 120° F.

The time for which contact is maintained between the pulp and the aqueous deinking medium is not critical. However, a contact time greater than about ten minutes is preferred from the standpoint of deinking performance, while a somewhat longer contact time, e.g., a time in the range from about 20 minutes to two hours is more preferred.

The present invention particularly centers upon the use in this contact step of a specified deinking agent. In one critical aspect, the deinking agent is specified as a combination of the two distinct types of alkanol ethoxylates. For purposes of describing this invention, water-soluble alkanol ethoxylates are understood to be the ethylene oxide adducts of detergent-range (i.e., $C_9$ to $C_{16}$) alkanols, containing as average of between about 6.5 and 20 oxyethylene units in the ethoxylate molecules, and preferably an average of between about 7 and 15 oxyethylene units. Most preferably, the water-soluble ethoxylate component of the deinking agent of the process of the invention is an ethoxylate of $C_{11}$ to $C_{15}$ alkanols and contains an average of between about 8 and 13 oxyethylene units per molecule. Oil-soluble ethoxylates are likewise ethylene oxide adducts of detergent-range alkanols, but contain an average of about 0.5 to 3.5 oxyethylene units in the ethoxylate molecules, and preferably an average of between about 1 and 3.5 oxyethylene units, and more preferably an average of between about 1 and 3 oxyethylene units. Most preferably, the oil-soluble ethoxylate component of the deinking agent is an ethoxylate of $C_{11}$ to $C_{15}$ alkanols and contains an average of between about 1.5 and 3 oxyethylene units per molecule.

The invention is intended to be limited to the specified alkanol ethoxylates and does not extend to substitution of these alkanol ethoxylates by other nonionic surfactants such as ethoxylates of the alkyl-substituted phenols.

Alkanol ethoxylates useful in the invention are most conventionally prepared by the addition reaction between ethylene oxide and an alkanol or a mixture of alkanols. This reaction is known to be promoted by both basic catalysts (e.g., basic compounds of alkali and alkaline earth metals which are soluble in the alkanol reactant) and acidic catalysts (e.g., Lewis acids such as boron tetrafluoride and tin tetrachloride). It is recognized that the product of such ethylene oxide addition reactions is a mixture of ethoxylate molecules, differing one from the other in the number of oxyethylene units in the molecule, i.e., the value of n in the above formula. For this reason, ethoxylation products are characteristically described in terms of the average number of oxyethylene units, per molecule, for the mixture. For purposes of specifying the average number of oxyethylene units per molecule for a given water-soluble or oil-soluble ethoxylate prepared by ethylene oxide addition reaction, the description of this invention follows the custom in the art of assigning an average calculated by dividing the total mols of ethylene oxide converted in the ethoxylation reaction in question by the total mols of alkanol present in the reaction mixture.

For purposes of the invention, the carbon chain R of the alkanol moiety of the ethoxylate molecule may be either primary, secondary, or tertiary and either branched or linear. However, ethoxylates having an alkanol moiety which is predominantly linear and primary are particularly preferred. Specific examples of suitable water-soluble alkanol ethoxylates derived from primary linear alkanols are the NEODOL Alcohol Ethoxylate products, trademark of and marketed by Shell Chemical Company. Such products include those designated NEODOL 25-7 (an ethoxylate of a mixture of $C_{12}$ to $C_{15}$ alkanols having an average of about 7 oxyethylene units per molecule), NEODOL 25-9 (an ethoxylate of a mixture of $C_{12}$ to $C_{15}$ alkanols having an average of about 9 oxyethylene units per molecule), NEODOL 25-12 (an ethoxylate of a mixture of $C_{12}$ to $C_{15}$ alkanols having an average of about 12 oxyethylene units per molecule), NEODOL 45-7 (an ethoxylate of a mixture of $C_{14}$ and $C_{15}$ alkanols having an average of about 7 oxyethylene units per molecule), NEODOL 45-13 (an ethoxylate of a mixture of $C_{14}$ and $C_{15}$ alkanols having an average of about 13 oxyethylene units per molecule), and NEODOL 91-8 (an ethoxylate of a mixture of $C_9$ to $C_{11}$ alkanols having an average of about 8 oxyethylene units per molecule. Mention can also be made of corresponding TERGITOL L Products of Union Carbide Corporation and the ETHONIC products of Ethyl Corporation. Examples of suitable oil-soluble ethoxylates of primary linear alkanols similarly include NEODOL 25-3 (an ethoxylate of a mixture of $C_{12}$ to $C_{15}$ alkanols having an average of about 3 oxyethylene units per molecule), NEODOL 91-2.5 (an ethoxylate of a mixture of $C_9$ to $C_{11}$ alkanols having an average of about 2.5 oxyethylene units per molecule), and of similar TERGITOL L and ETHONIC products. Very suitable results can also be obtained with water-soluble and oil-soluble ethoxylates derived from secondary alkanols. Specific examples of commercially-available water-soluble ethoxylates of secondary alkanols include the TERGITOL S ethoxylates, including those available under the designations TERGITOL 15-S-7, TERGITOL 15-S-9, TERGITOL 15-S-12, and TERGITOL 15-S-15, which are ethoxylates of mixtures of $C_{11}$ to $C_{15}$ secondary linear alkanols, having averages of about 7, 9, 12, and 15 oxyethylene units per molecule, respectively. Particular preference exists for an alkanol moiety which is predominantly linear and primary. Further description and examples of water-soluble and oil-soluble ethoxylates are found in the aforementioned U.S. Pat. No. 4,162,186, the relevant disclosure of which is incorporated herein by this reference.

In another critical aspect, the deinking agent necessarily combines the water-soluble ethoxylate and the oil-soluble ethoxylate in specified proportions. In general, it is necessary to the desired low-foaming properties that the deinking agent of the process of the invention be characterized by a weight ratio of water-soluble ethoxylate to oil-soluble ethoxylate which does not exceed about 2:1. Compositions characterized by higher ratios of water-soluble to oil-soluble ethoxylates are found to be responsible for undesirably high levels of foaming in an aqueous system. This is the case, for instance, for the combinations of water-soluble and oil-soluble ethoxylates which have been described in the aforementioned U.S. Pat. No. 4,162,186 and which are critically specified in terms of a weight ratio of at least 3:1, particularly a ratio in the range from 3:1 to 6:1. It is now found that the desired improvements with respect to reduction of foaming are realized only at lower ratios than those specified by the prior art, and particularly at ratios up to 2:1. From the standpoint of foaming properties, further preference can be expressed for a deinking agent having a ratio of the water-soluble ethoxylate component to the oil-soluble ethoxylate component which does not exceed about 1.85:1, while a ratio not exceeding about 1.2:1 is considered more preferred, and a ratio not exceeding about 1:1 is considered most preferred.

From the standpoint of the effectiveness of the process for ink removal, the deinking agent preferably comprises the water-soluble ethoxylate component and the oil-soluble ethoxylate component in a weight ratio of at least about 1:3. Somewhat higher ratios are generally more preferred for deinking performance, particularly ratios of at least about 1:2 and most particularly of at least about 1:1.

Overall, taking into account both the aspects of foaming and deinking performance, the invention is preferably practiced using a deinking agent characterized by a weight ratio of the water-soluble ethoxylate component to the oil-soluble ethoxylate component which is in the range from 2:1 to 1:3, more preferably in the range from about 1.85:1 to about 1:2, and most preferably in the range from about 1.6:1 to 1:1.

Following the contact step between the pulp and the aqueous medium containing the particular deinking agent, the contact mixture is treated for separation between the pulp fibers and the ink particles which are both dispersed, or suspended, in the medium. Separation of one or the other from the medium is suitably accomplished by techniques commonly applied in conventional deinking practices, including those treatments known in the art as washing and flotation. In washing, the ink particles are rinsed from the pulp by contact with a flow of water, usually a countercurrent flow relative to the pulp. Among the devices commercially utilized for pulp washing and suitable for service in the practice of the invention mention may be made of the sidehill screen, the gravity decker or drum washer, the inclined screw extractor, the screw press, and centrifugal cleaners of various designs. Flotation is known to be an alternative to washing in which air or another gas is bubbled through the pulp. Ink particles selectively adhere to the bubbles and float to the surface, forming a froth which can be skimmed off. It will be understood that in addition to pulping, contact, and ink removal steps described herein, the invention may be practiced using other process steps as are employed in wastepaper reclamation operations in general and newsprint deinking in particular.

The invention is now further described by reference to the following Examples, which are intended to illustrate certain preferred embodiments and not to limit its broader scope.

The several Examples describe several series of experiments for newsprint deinking and represent practices in accordance with the invention (and, for comparative purposes, practices not in accordance with the invention) with respect to the composition of the alkanol ethoxylate deinking agent. The Examples further describe foam tests of each of the deinking agents.

The alkanol ethoxylate surfactants referred to as components of deinking agents in these Examples are as follows:

| ethoxylate | description |
| --- | --- |
| A | A water-soluble ethoxylate of a mixture of $C_{12}$ to $C_{15}$ primary linear alkanols (about 30% w $C_{12}$, 25% w $C_{13}$, 25% w $C_{14}$, and 20% w $C_{15}$) containing an average of about 9 oxyethylene units per molecule. |
| B | A water-soluble ethoxylate of a mixture of $C_{14}$ and $C_{15}$ primary linear alkanols (about 60% w $C_{14}$ and 40% w $C_{15}$) containing an average of about 13 oxyethylene units per molecule. |
| C | A water-soluble ethoxylate of a mixture of $C_{12}$ to $C_{15}$ primary linear alkanols (about 30% w $C_{12}$, 25% w $C_{13}$, 25% w $C_{14}$ and 20% w $C_{15}$) containing an average of about 7 oxyethylene units per molecule. |
| D | A water-soluble ethoxylate of a mixture of $C_{12}$ to $C_{15}$ primary linear alkanols (about 30% w $C_{12}$, 25% w $C_{13}$, 25% w $C_{14}$ and 20% w $C_{15}$) containing an average of about 12 oxyethylene units per molecule. |
| E | A water-soluble ethoxylate of a mixture of $C_{14}$ and $C_{15}$ primary linear alkanols (about 60% w $C_{14}$ and 40% w $C_{15}$) containing an average of about 7 oxyethylene units per molecule. |
| F | A water-soluble ethoxylate of a mixture of $C_{14}$ and $C_{15}$ primary linear alkanols (about 60% w $C_{14}$ and 40% w $C_{15}$) containing an average of about 9 oxyethylene units per molecule. |
| G | An oil-soluble ethoxylate of a mixture of $C_{12}$ to $C_{15}$ primary linear alkanols (about 30% w $C_{12}$, 25% w $C_{13}$, 25% w $C_{14}$, and 20% w $C_{15}$) containing an average of about 3 oxyethylene units per molecule. |
| H | An oil-soluble ethoxylate of a mixture of $C_9$ to $C_{11}$ primary linear alkanols (about 20% w $C_9$, 40% w $C_{10}$, and 40% w $C_{11}$) containing an average of about 2.5 oxyethylene units per molecule. |
| I | An oil-soluble ethoxylate of a mixture of $C_{14}$ and $C_{15}$ primary linear alkanols (about 60% w $C_{14}$ and 40% w $C_{15}$) containing an average of about 2.25 oxyethylene units per molecule. |
| J | An ethoxylate of a mixture of $C_{12}$ to $C_{15}$ primary linear alkanols (about 30% w $C_{12}$, 25% w $C_{13}$, 25% w $C_{14}$, and 20% w $C_{15}$) containing an average of about 5.75 oxyethylene units per molecule. This ethoxylate does not qualify as either a water-soluble or an oil-soluble surfactant, as those terms are used in describing this invention. |

The Examples describe experiments in which these surfactants and their mixtures were tested both for their performance as deinking agents in the processing of waste newsprint and for their properties with respect to promoting foam generation in aqueous media. The deinking performance tests involved the following procedure.

Sample preparation. Newsprint was shredded by hand and mixed well. Unprinted margins of the paper were trimmed before shredding and collected for use as a blank standard.

Hydropulping. Sufficient tap water was added to 12 g of the shredded paper to bring the total volume to 0.4 liters, and borax was added to adjust pH to about 8. The paper in the mixture was then disintegrated by blending for ten seconds in a commercial one-liter blender.

Deinking. To this mixture portion was then added sodium metasilicate to maintain the desired pH of about 9 and 0.12 g of the deinking agent (1%w calculated on weight of dry paper). Deinking was carried out for thirty minutes with agitation (mechanical stirring) at 40°-45° C. The pulp consistency of this agitated deinking mixture was 3%. The total mixture was then divided into the four portions, each 100 milliliters in volume and containing 3 g of pulp.

Washing. Each deinked pulp solution was next drained onto a #20 ASTM sieve. Pulp collected in the sieve was rinsed under running tap water and then transferred to a beaker containing about 250 ml water. The beaker contents were stirred by hand for a few minutes and then drained onto the sieve. These washing procedures were twice repeated (a total of three washings).

Following the washing step, the pulp mixture was diluted to a 1.5%w consistency and treated with 0.2%w sodium hydrosulfite at a pH of 4.5-5.0 (adjusted with dilute HCl) at room temperature for 15 minutes. This sodium hydrosulfite treatment helps improve paper brightness and prevent degradation of pulp fiber. After this treatment step, the mixture was again drained and the pulp collected.

Paper making. Deinking process performance was measured by making paper from the deinked pulp and analyzing the paper for brightness and dirt count. For this purpose, the collected pulp was transferred to a container and tap water added to bring volume up to one liter. The one liter pulp solution was dispersed (250 ml of solution and 3 g of pulp at a time) in 7 liter of tap water in a TMI TAPPI (Technical Association of the Pulp and Paper Industry) Standard Sheet Machine. In the machine, pulp was deposited forming a wet sheet, while water drained rapidly. The sheet thus formed was covered with a piece of thick wet filter paper followed by a piece of thick dry filter paper and the several layers then squeezed by rolling with a 30 lb. rolling pin. The layers were next removed from the apparatus and the prepared sheet separated from the filter papers. Finally, the prepared sheet was placed between four thick filter papers (two above and two below), pressed with a force of 50 psig, and dried between fresh thick filter papers at room temperature in the dark for 24 hours.

The papers ("handsheets") thus prepared were analyzed for brightness, in comparison to handsheets prepared from the blank standard using the same procedures. Brightness measurements were made on the basis of percent light reflection from the sheet, using a standardized Technidyne S-4 Brightness Tester. Eight measurements were made for each sheet, one at the center of each of four quadrants on both sides, and the eight values averaged for the sheet. Normally the eight separate measurements for the sheet varied over a range of no more than 1.0%. Reported brightness readings were the average of the brightness results for at least three similarly processed sheets.

The handsheets were also visually inspected (eye and/or microscope) for ink ("dirt") particles. Dirt count (in ppm) was carried out according to TAPPI standard procedure T437 ppm-78, which takes into account particle size. A 5.5 cm by 5.5 cm area of the handsheet was counted to represent the total sheet. An area was counted on both sides of the sheet, the two values added, and the result rounded off to the nearest five units for reporting. An alternate dirt count (reported in specks per gram of paper, and also rounded off to the nearest unit of five) was also obtained by counting all specks regardless of particle size. This alternative count was taken for representative areas of both sides of the sheet and divided by the weight of the handsheet (air dried).

Foam properties were determined using a dynamic spray foam test, in which aqueous surfactant solutions were circulated from a reservoir and sprayed onto the reservoir solution surface. The reservoir was a vertical cylinder filled with 3 liters of surfactant solution (0.1%w surfactant in water). The surfactant solution was first pumped from and returned to the reservoir, below the liquid surface, for thorough mixing. Then the solution was pumped to a spray nozzle fixed above the reservoir liquid surface and sprayed down onto the surface. Foam height in the cylinder was measured (in cm) at 10, 15, and 20 minute intervals after spraying was commenced.

EXAMPLE 1

A series of deinking and foam tests were made of mixtures containing different proportions of the water-soluble ethoxylate A and the oil-soluble ethoxylate G. The experiments included several carried out in accordance with the invention using a deinking agent having a ratio of the water-soluble to oil-soluble components up to about 2:1, as well as several comparative tests of deinking agents having a greater ratios of water-soluble to oil-soluble components.

Results for these tests, presented in Table 1, indicate the importance to a low foaming process of the requirement that the weight ratio of water soluble ethoxylate to oil-soluble ethoxylate not exceed about 2:1. The results also show that improvement in deinking agent foaming characteristics can be accomplished by practice under this invention without sacrifice in deinking performance.

TABLE 1

| Weight ratio, water-sol. ethoxylate to oil-sol. ethoxylate | Foam height (cm) after | | | Deinking Performance | | |
|---|---|---|---|---|---|---|
| | 10 min | 15 min | 20 min | Brightness (%) | TAPPI ppm | Dirt Count (sp/g) |
| 100:0 | 11 | 25 | 32 | 50 | 10 | 15 |
| 83:17 | 12 | 23 | 29 | — | — | — |
| 80:20 | 10 | 21 | 29 | 50 | 15 | 10 |
| 65:35* | 0 | 10 | 12 | 50 | 10 | 15 |
| 55:45* | 0 | 0 | 6 | 47 | 10 | 15 |
| 45:55* | 0 | 0 | 0 | 49 | 5 | 5 |

*According to the invention.

EXAMPLE 2

Another series of deinking and foam tests were made of mixtures containing different proportions of the water-soluble ethoxylate B and the oil-soluble ethoxylate G. These experiments included several carried out in accordance with the invention using a deinking agent having a ratio of the water-soluble to oil-soluble components up to about 2:1, as well as several comparative tests of deinking agents having a greater ratios of water-soluble to oil-soluble components.

Results, presented in Table 2, again point to the significant influence of the relative proportions of the two types of ethoxylates on foaming properties. Improvement in process foaming characteristics is achieved by practice according to the invention, without sacrifice in deinking performance.

TABLE 2

| Weight ratio, water-sol. ethoxylate to oil-sol. ethoxylate | Foam height (cm) after | | | Deinking Performance | | |
|---|---|---|---|---|---|---|
| | 10 min | 15 min | 20 min | Brightness (%) | TAPPI ppm | Dirt Count (sp/g) |
| 100:0 | 8 | 22 | 30 | 49 | — | — |
| 80:20 | 7 | 18 | 27 | 49 | — | — |
| 65:35* | 0 | 0 | 7 | 49 | 10 | 15 |
| 55:45* | 0 | 0 | 0 | 49 | — | — |
| 45:55* | 0 | 0 | 0 | 49 | — | — |
| 35:65* | 0 | 0 | 0 | 50 | 10 | 5 |

*According to the invention

EXAMPLE 3

The invention is suitably practiced using a mixture of two or more water-soluble ethoxylates for the water-soluble ethoxylate component of the deinking agent and/or a mixture of two or more oil-soluble ethoxylates for the oil-soluble ethoxylate component of the deinking agent. Two experiments were carried out to test the foaming properties and deinking performance of such mixtures.

In a first experiment (designated a), the deinking agent contained a 50:50 ratio of water soluble ethoxylate to oil-soluble ethoxylate. The water-soluble ethoxylate component was a mixture of equal parts by weight of surfactants A and C. Surfactant G was used as the oil-soluble component. The resulting mixture was, thus, 25% A+25% C:50% G.

In a second experiment (designated b), the deinking agent also contained a 50:50 ratio of water soluble ethoxylate to oil-soluble ethoxylate. The water-soluble ethoxylate component was in this case a mixture of equal parts by weight of surfactants C and D. Surfactant G was again used as the oil-soluble component. The resulting mixture was, thus, 25% C+25% D:50% G.

Results of these two experiments are provided in Table 3. Both experiments utilize deinking agents in accordance with the invention.

TABLE 3

| Experiment | Foam height (cm) after | | | Deinking Performance | | |
|---|---|---|---|---|---|---|
| | 10 min | 15 min | 20 min | Brightness (%) | TAPPI ppm | Dirt Count (sp/g) |
| a. | 0 | 0 | 0 | 47 | 5–10 | 10–15 |
| b. | 0 | 2 | 7 | 48 | 15 | 20 |

COMPARATIVE EXAMPLE 4

This comparative example describes the results of deinking and foam tests of a single alkanol ethoxylate (designated surfactant J) which was prepared to contain an average of about 5.75 oxyethylene units per molecule, a value which approximates the overall average for the mixture of three surfactants of experiment a of Example 3 (i.e., the deinking agent containing 25% of water-soluble surfactant C, 25% of water-soluble surfactant A and 50% of oil-soluble surfactant G). Table 4 presents the results of the tests of surfactant J in comparison to the results of experiment a of Example 3.

TABLE 4

| Deinking Agent | Foam height (cm) after | | | Deinking Performance | | |
|---|---|---|---|---|---|---|
| | 10 min | 15 min | 20 min | Brightness (%) | TAPPI ppm | Dirt Count (sp/g) |
| Surfactant J | 0 | 7 | 13 | 46–47 | 5 | 10 |
| 25C + 25A:50G* | 0 | 0 | 0 | 47 | 5–10 | 10–15 |

*According to the invention.

Table 4 illustrates that the invention is critically dependent for the desired low-foaming properties upon the blend of the distinct water-soluble and oil-soluble surfactants, and not merely upon the overall average value for the oxyethylene content of total ethoxylate present.

COMPARATIVE EXAMPLE 5

Table 5 summarizes the results of deinking and foam generation tests carried out for a variety of deinking agents containing one or more water-soluble and/or oil soluble alkanol ethoxylates. In each case, these deinking agents were characterized by a high ratio of water-soluble ethoxylate to oil soluble ethoxylate (i.e., a ratio of at least about 4:1) and thus were not in accordance with this invention. In each case, the particular deinking agent was found to be characterized by an undesirably high level of foam generation.

TABLE 5

| Weight ratio, water-sol. ethoxylate to oil-sol. ethoxylate | Foam height (cm) after | | | Deinking Performance | | |
|---|---|---|---|---|---|---|
| | 10 min | 15 min | 20 min | Brightness (%) | TAPPI ppm | Dirt Count (sp/g) |
| 100 E:0 | 3 | 17 | 24 | 46 | 15 | 20 |
| 100 F:0 | 7 | 22 | 33 | 50 | 10 | 70 |
| 50 A + 50 E:0 | 9 | 17 | 25 | 49 | 30 | 25 |
| 80 E:20 H | 0 | 4–6 | 10–13 | — | — | — |
| 80 A:20 H | 1–5 | 15 | 19 | 45–49 | 5–10 | 5–10 |
| 80 A:20 I | 1 | 13 | 19 | — | — | — |
| 80 C:20 G | 0 | 7 | 13 | 48 | 10 | 10 |

I claim as my invention:

1. A process for the deinking of waste newsprint, which comprises steps for
   (a) converting the waste newsprint to a pulp,
   (b) contacting and agitating the pulp in an aqueous medium containing a deinking agent comprising a mixture of (i) a water-soluble $C_9$ to $C_{16}$ alkanol ethoxylate component having an average of about 6.5 to 20 oxyethylene units per ethoxylate molecule and (ii) an oil-soluble $C_9$ to $C_{16}$ alkanol ethoxylate component having an average of about 0.5 to 3.5 oxyethylene units per ethoxylate molecule, said mixture containing the respective components (i) and (ii) in a relative weight ratio in the range from about 2:1 to 1:3, and said mixture being present in said aqueous medium in an amount between about 0.1 and 5 percent by weight based on the dry weight of the newsprint fiber, and
   (c) recovering deinked pulp from the aqueous medium.

2. The process of claim 1, wherein the respective weight ratio of components (i) and (ii) is in the range from about 1.85:1 to 1:2.

3. The process of claim 2, wherein the water-soluble alkanol ethoxylate has an average of about 7 to 15 oxyethylene units per ethoxylate molecule.

4. The process of claim 3, wherein the oil-soluble alkanol ethoxylate has an average of about 1 to 3 oxyethylene units per ethoxylate molecule.

5. The process of claim 4, wherein the respective weight ratio of components (i) and (ii) is in the range from about 1.6:1 to 1:1.

6. The process of claim 5, wherein the water-soluble alkanol ethoxylate has an average of about 8 to 13 oxyethylene units per ethoxylate molecule.

7. The process of claim 6, wherein the oil-soluble alkanol ethoxylate has an average of about 1.5 to 3 oxyethylene units per ethoxylate molecule.

8. The process of claim 7, wherein the water-soluble and the oil-soluble ethoxylates are ethoxylates of $C_{11}$ to $C_{15}$ alkanols.

9. The process of claim 1, wherein the aqueous medium contains between about 1 and 5%w of pulp and step (b) of the process is carried out at a temperature between about 70° and 130° F.

10. The process of claim 4, wherein the aqueous medium contains between about 1 and 5%w pulp and step (b) of the process is carried out at a temperature between about 70° and 130° F.

11. The process of claim 7, wherein the aqueous medium contains between about 1 and 5%w pulp and step (b) of the process is carried out at a temperature between about 70° and 130° F.

12. The process of claim 8, wherein the aqueous medium contains between about 1 and 5%w pulp and step (b) of the process is carried out at a temperature between about 70° and 130° F.

13. The process of claim 12, wherein the water-soluble and oil-soluble ethoxylates have both been derived from alkanols which are predominantly linear and primary.

* * * * *